(12) United States Patent
Schneider et al.

(10) Patent No.: US 6,708,380 B2
(45) Date of Patent: Mar. 23, 2004

(54) BREAKAWAY LATCH PLATE

(75) Inventors: David W. Schneider, Waterford, MI (US); Pontus Soderstrom, Rochester Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/104,261

(22) Filed: Mar. 20, 2002

(65) Prior Publication Data

US 2003/0177621 A1 Sep. 25, 2003

(51) Int. Cl.[7] ................................................ A44B 11/26
(52) U.S. Cl. ............................ 24/633; 24/629; 24/636; 280/801.1; 280/808
(58) Field of Search ........................... 24/629, 633, 635, 24/636, 656, 664, 136 R, 136 K; 280/801.1, 801.2, 802, 807, 808

(56) References Cited

U.S. PATENT DOCUMENTS

| | | | | |
|---|---|---|---|---|
| 4,614,007 A | * | 9/1986 | Else ........................... 24/136 K |
| 5,058,244 A | * | 10/1991 | Fernandez ..................... 24/170 |
| 5,100,176 A | | 3/1992 | Ball et al. | |
| 5,471,717 A | * | 12/1995 | Ennerdal et al. .............. 24/633 |
| 5,634,664 A | | 6/1997 | Seki et al. | |
| 5,983,463 A | * | 11/1999 | Prentkowski et al. ......... 24/196 |
| 6,439,601 B1 | * | 8/2002 | Iseki .......................... 280/733 |
| 6,490,764 B1 | * | 12/2002 | Bell ........................... 24/198 |

* cited by examiner

*Primary Examiner*—Anthony Knight
*Assistant Examiner*—André L. Jackson
(74) *Attorney, Agent, or Firm*—James D. Erickson; Sally J. Brown

(57) ABSTRACT

A breakaway latch plate for use with the seat belt system is disclosed. The breakaway latch plate includes a latch plate body that may be selectively secured to a buckle. An orifice may be disposed within the latch plate body. Seat belt webbing passes through the orifice. A locking mechanism is coupled to the latch plate body. In a locked state, the locking mechanism prevents movement of the seat belt webbing relative to the latch plate body. When a predetermined load is applied to the seat belt webbing, the locking mechanism changes to an unlocked state, in which the seat belt webbing may move relative to the latch plate body.

23 Claims, 5 Drawing Sheets

BREAKAWAY LATCH PLATE

BACKGROUND OF THE INVENTION

1. Field of the Invention

The present invention relates to a latch plate for a seat belt system. More specifically, the present invention relates to a breakaway latch plate that maintains seat belt webbing at a fixed position relative to the plate during normal usage, but allows movement of the seat belt webbing in accident conditions.

2. Technical Background

Seat belts are known to increase the safety of occupants in various motorized vehicles. Seat belt use is often cited as the most useful line of defense in reducing accident related injuries. The actions of consumer groups, governmental agencies, and political activists all reflect the tremendous societal value of seat belt use. Legislation requiring manufacturers to include seat belts in their vehicles has been in place for many years. More recently, laws have been enacted requiring consumers to use seat belts.

The benefits of seat belt use are numerous. In a collision, seat belts may prevent the occupant of a vehicle from striking the interior of the vehicle or other objects within the vehicle, including other occupants. Seat belts aid in keeping the occupant inside the vehicle, where the chances of survival are much greater. Seat belts may also keep the driver behind the wheel and in control of the vehicle in a collision, averting additional damage or injuries. Seat belts also enhance the effectiveness of other safety devices. For example, in a vehicle with airbags, a seat belt keeps the occupant in the seat, so the airbag can better protect the occupant.

Statistics show that lap and shoulder belts, when used properly, reduce the risk of fatal injury in front-seat occupants of cars by 45 percent and the risk of moderate-to-critical injury by 50 percent. With respect to light truck occupants, seat belts reduce the risk of fatal injury by 60 percent and moderate-to-critical injury by 65 percent.

Seat belts vary in their configuration, but one of the most common types of seat belts is the lap belt. The lap belt includes right and left belts, which traverse an occupant's lap and are secured to each other by a buckle, which is often located near the occupant's mid-abdomen. Lap belts are found in many different types of vehicles throughout the world.

Although conventional lap belts are well used and accepted, they do not limit movement of an occupant's head and torso. Thus, although the lower body is restrained, the upper body may experience rapid and dangerous movement during an accident. This is particularly dangerous for passengers in the front seat of an automobile, who may strike the steering wheel, dashboard, or windshield during an accident.

A seat belt having a shoulder strap limits an occupant's upper body movement in an accident, providing improved and potentially lifesaving restraint. Shoulder-strap restraints come in various configurations, involving both single- and double-strap implementations. In one commonly employed shoulder-strap configuration, the seat belt webbing traverses the occupant's upper body in a diagonal fashion, passes through a latch plate, and then traverses the occupant's lap. The latch plate is fastened to a buckle, which is secured to the vehicle. This seat belt system is frequently employed in passenger vehicles and is frequently referred to as a three-point seat belt system.

However, in this configuration, problems arise in loading and unloading occupants. Often the latch plate becomes dislocated from its correct position, making it difficult for the occupant to locate the latch plate or correctly position the latch plate before engaging the seat belt.

Dislocation of the latch plate creates a number of safety and convenience issues. For example, the latch plate could move so far from its correct position that it may be difficult for the occupant to locate or secure the latch plate, discouraging the occupant from using the seat belt. Also, in this condition, the seat belt webbing is more likely to become knotted or entangled with other items around the seat belt. Further, if the latch plate is not in the correct position when in use, the seat belt webbing may have slack, preventing the seat belt from safely restraining the occupant during an accident.

Locking the latch plate into a fixed position relative to the seat belt webbing is one potential solution to the problems noted above. However, this solution has substantial limitations in certain scenarios. In a collision, the torso of the occupant is often thrust forward, applying great pressure to the torso portion of the seat belt webbing (the portion of the seat belt webbing above the latch plate). If the latch plate is locked into position relative to the seat belt webbing, the tension in the torso portion of the seat belt webbing will not be transferred to the lap portion of the seat belt webbing (the portion of the seat belt webbing below the latch plate). As a consequence, the lap portion of the seat belt webbing may be undesirably loose.

In this condition, the occupant's lower body may strike portions of the vehicle or other objects with great force. Most dangerously, lacking tension in the lap portion of the seat belt webbing, the occupant may slide completely or partially out of the seat belt restraint (a process known as "submarining"), resulting in potentially more serious injuries. The transfer of tension from the torso portion of the seat belt to the lap portion of the seat belt during an accident is desirable and enhances the restraining capabilities of the seat belt.

Thus, it would be an advancement in the art to provide a latch plate that maintains a fixed position relative to the seat belt webbing during normal usage, but enables movement of the seat belt webbing relative to the plate in the event of an accident.

Such a latch plate is disclosed and claimed herein.

SUMMARY OF THE INVENTION

The apparatus and methods of the present invention have been developed in response to the present state-of-the-art, and, in particular, in response to problems and needs in the art that have not yet been fully resolved by currently available inflatable seat belt systems. The present invention provides an apparatus for enhancing the effectiveness of seat belt systems. To achieve the foregoing, and in accordance with the invention as embodied and broadly described in the preferred embodiment, a breakaway latch plate is disclosed that maintains seat belt webbing at a fixed position relative to the plate during normal usage, but allows movement of the seat belt webbing relative to the latch plate during accident conditions.

In one embodiment, the breakaway latch plate may be used in connection with a three-point seat belt system. A three-point seat belt system may include seat belt webbing connected at one end to a torso retractor and at the other end to lap retractor.

The breakaway latch plate, which is coupled to the seat belt webbing, includes a latch plate body. More specifically, an interior surface of the latch plate body defines an orifice through which the seat belt webbing passes. The latch plate body includes a buckle interface that may interface with and be inserted into a buckle to secure the seat belt webbing across an occupant of the vehicle. When the buckle interface is secured to the buckle, a torso portion of the seat belt webbing diagonally traverses the occupant's body, while a lap portion of the seat belt webbing crosses the occupant's lap.

A locking mechanism is coupled to the latch plate body. The locking mechanism prevents movement of the seat belt webbing relative to the latch plate body when the locking mechanism is in a locked state. Conversely, when the locking mechanism is in an unlocked state, the locking mechanism permits movement of the seat belt webbing relative to the latch plate body.

The locking mechanism changes from the locked to the unlocked state in response to at least a predetermined load being applied to the seat belt webbing, such as during accident conditions. As a consequence, during an accident, tension in the torso portion of the seat belt webbing may be transferred to the lap portion of the seat belt webbing to provide additional restraint to an occupant's legs and lower body.

The predetermined load required to change the breakaway latch plate from the locked to the unlocked state may be set by a manufacturer of the latch plate through, for instance, selection of materials of a particular strength to make the locking mechanism. Also, variations in the design of the locking mechanism contribute to setting the predetermined load required to change the plate into an unlocked state.

The locking mechanism may be embodied in various forms, four of which are disclosed herein. The disclosed embodiments are, of course, merely illustrative, not limiting of the scope of this invention.

The first embodiment includes a cam having a guide track, a pin opening, and a movable gripping mechanism. A guide pin, which is also attached the latch plate body, is disposed within the guide track. The guide track may be embodied in various forms, following both linear and nonlinear paths. In one embodiment, the guide track is sized just large enough to receive the guide pin, but to not permit the guide pin to move within the track.

A breakaway pin, which is attached to the latch plate body, is disposed within the pin opening. The breakaway pin is designed to break upon the application of at least a predetermined force to the pin.

The movable gripping mechanism (e.g., teeth) of the cam contacts and grips the seat belt webbing passing through the orifice when the locking mechanism is in a locked state. When a load is applied to the seat belt webbing, force is applied to the moveable gripping mechanism and cam. Consequently, force is applied to the breakaway pin. When the load is equal to or exceeds a predetermined load set by the manufacturer of the breakaway latch plate, the breakaway pin breaks and the cam (along with the movable gripping mechanism) rotates away from the seat belt webbing about the guide pin, permitting the seat belt webbing to move relative to the latch plate body.

In a second embodiment of the breakaway latch plate, the locking mechanism includes a locking pin. The interior surface, which defines the orifice through which the seat belt webbing passes, further defines a retention notch within the orifice. An aperture is disposed within the seat belt webbing.

The locking pin is disposed through the aperture in the seat belt webbing when the locking mechanism is in a locked state. In the locked state, the locking pin is also disposed, at one end, within the retention notch. The other end of the locking pin is attached to a hinged cam. The hinged cam is rotatably connected to the latch plate body.

When a load is applied to the seat belt webbing, the edges of the aperture exert force on the locking pin. If the applied load is equal to or greater than a predetermined load, the locking pin deforms and is displaced from both the retention notch and the aperture, permitting movement of the seat belt webbing relative to the latch plate body.

In a third embodiment of the breakaway latch plate, a locking pin, which is frangible, includes a first and a second end. The interior surface defining the orifice also defines at least one retention notch for receiving the first and second ends of the locking pin. Again, an aperture is disposed in the seat belt webbing.

In a locked state, the locking pin is disposed through the aperture of the seat belt webbing, and the first and second ends of the locking pin are retained within the one or more retention notches.

When a load is applied to the seat belt webbing, the edges of the aperture in the webbing exert force on the locking pin. As stated above, the locking pin is frangible. Consequently, when at least a predetermined load is applied to the seat belt webbing, the locking pin breaks so that the seat belt webbing may move relative to the latch plate body.

The fourth embodiment of the locking mechanism is similar to the third embodiment. However, instead of the locking pin being frangible, the retention notches are frangible. As a consequence, in a locked state, the locking pin passes through the aperture and the first and second ends of the locking pin are disposed within at least one frangible retention notch.

Again, when a load is applied to the seat belt webbing, the seat belt webbing at the edges of the aperture applies force to the locking pin and consequently to the frangible retention notches. When the predetermined load is applied to the seat belt webbing, the notch, rather than the locking pin, breaks to permit the seat belt webbing to move relative to the latch plate body.

In view of the foregoing, the breakaway latch plate offers advantages not present in conventional latch plates. The breakaway latch plate retains a fixed position relative to the seat belt webbing during normal usage. Thus, the latch plate may be conveniently accessed and used by an occupant. However, in accident conditions, the seat belt webbing may move with respect to the latch plate body, permitting tension from the torso portion of the seat belt webbing to be transferred to the lap portion of the seat belt webbing and vice versa.

These and other advantages of the present invention will become more fully apparent from the following description and appended claims, or maybe learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings illustrate only selected embodiments of the invention and are not therefore to be considered limiting in scope, the invention will be described and explained with additional specificity and detail through the use of the accompanying drawings in which.

DETAILED DESCRIPTION OF THE PREFERRED EMBODIMENTS

The preferred embodiments of the invention are now described with reference to FIGS. 1–5. The members of the present invention, as generally described and illustrated in the Figures, may be implemented in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

Furthermore, the particular features, structures, or characteristics may be combined in any suitable manner in one or more embodiments. In the following description, numerous specific details are provided to convey a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
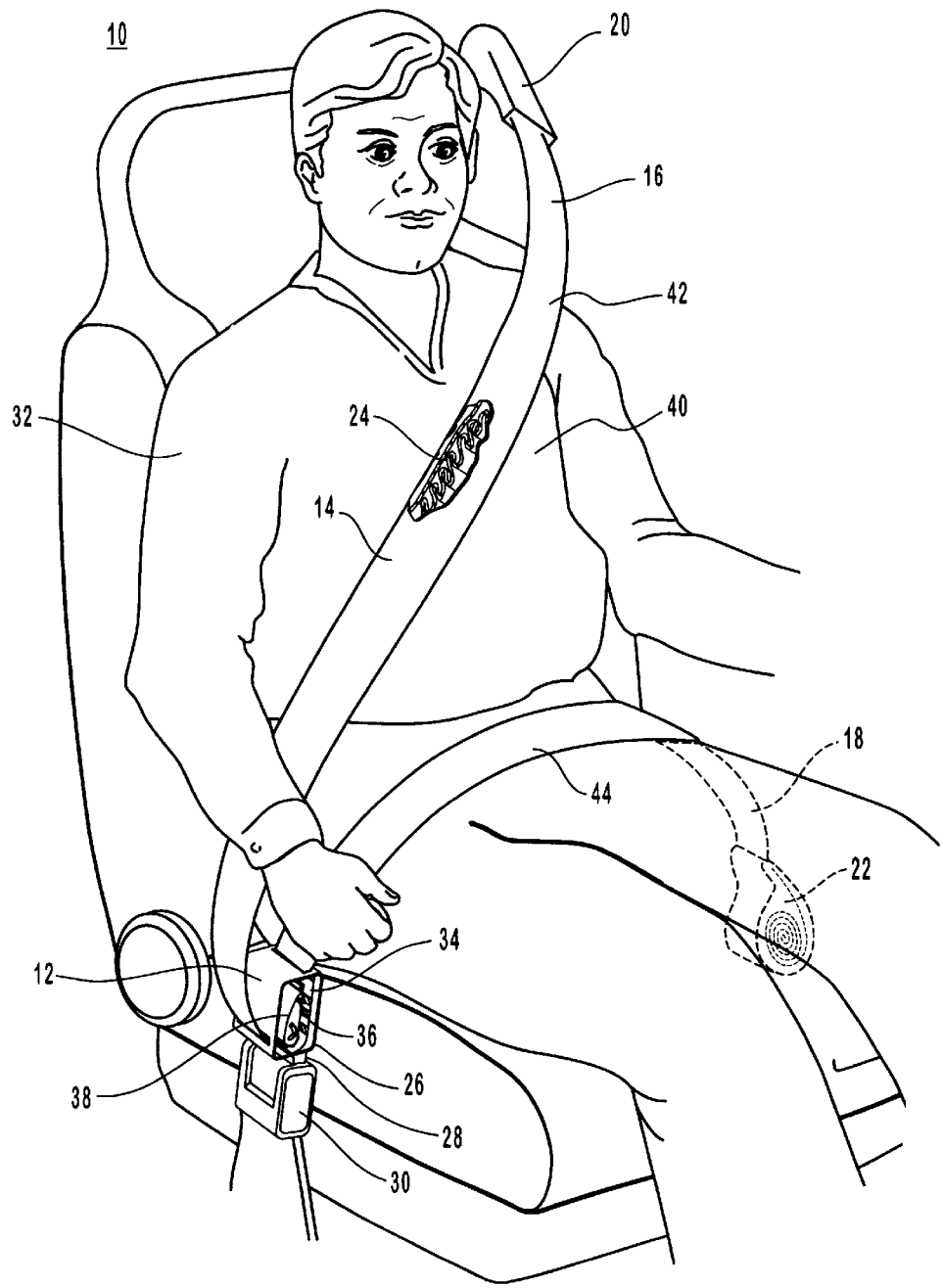
FIG. 1 is a plan view of a three-point seat belt system including a breakaway latch plate.

FIG. 1 is a plan view of a three-point seat belt system 10 including a breakaway latch plate 12. Three-point seat belt systems 10 are well-known in the art and are frequently implemented in connection with passenger vehicles.

Seat belt webbing 14 used in connection with such a system 10 may have a first end 16 and a second end 18. The first end 16 of the seat belt webbing 14 may be coupled to a torso retractor 20, and the second end 18 may be coupled to a lap retractor 22. Retractors 20, 22 are well-known in the art and serve to stop movement of the seat belt webbing 14 when a corresponding vehicle rapidly accelerates or decelerates or when seat belt webbing 14 is rapidly pulled from the retractor 20, 22.

The breakaway latch plate 12, which will be described in detail below, may be used in connection with both conventional, uninflatable seat belt webbing 14 and inflatable seat belt webbing 14. Inflatable seat belt webbing 14 includes seat belt webbing 14 in which inflatable members 24 (similar to airbags) are disposed on or within the seat belt webbing 14. If an inflatable member 24 is disposed within the seatbelt webbing 14, the webbing 14 may include a frangible seam (not shown) that ruptures upon inflation of the member 24. Inflatable members may be in fluid communication with an inflator (not shown) that transmits gas or other filler medium to the inflatable members in the event of an accident.

As stated above, FIG. 1 also illustrates a breakaway latch plate 12. The breakaway latch plate 12 may include a latch plate body 26 having a buckle interface 28. The buckle interface 28 interfaces with and may be inserted into a buckle 30, which is attached to a corresponding vehicle, for securing the seat belt webbing 14 across an occupant 32 of the vehicle.

The breakaway latch plate 12 may include an interior surface 34 defining an orifice 36 through which the seat belt webbing 14 passes. The orifice 36 may be configured in various shapes and dimensions according to, for example, the dimensions of the seat belt webbing 14 passing through the orifice 36.

A locking mechanism 38 may be coupled to the latch plate body 26. The locking mechanism 38 may have a locked and an unlocked state. In the locked state, the locking mechanism 38 prevents movement of the seat belt webbing 14 relative to the latch plate body 26. In the unlocked state, the locking mechanism 38 permits movement of the seat belt webbing 14 relative to the latch plate body 26.

The locking mechanism 38 changes from the locked state to the unlocked state in response to at least a predetermined load being applied to the seat belt webbing 14. For instance, in an accident, the torso 40 of the occupant 32 may be thrust forward, applying pressure to the torso portion 42 of the seat belt webbing 14 (the portion of the seat belt webbing 14 above the latch plate 12). If the pressure applied to the seat belt webbing 14 is greater than or equal to the predetermined load, the locking mechanism 38 changes to the unlocked state, permitting the tension from the torso portion 42 of the seat belt webbing 14 to be transferred to the lap portion 44 of the seat belt webbing 14 (the portion of the seat belt webbing 14 below the latch plate 12). The predetermined load required to change the locking mechanism 38 into the unlocked state may be specified by a particular manufacturer of the breakaway latch plate 12.

The predetermined load required to change the breakaway latch plate 12 from the locked to the unlocked state may be determined by a manufacturer of the plate 12 through, for instance, selection of materials of a particular strength to make the plate 12. Also, variations in the design of the breakaway latch plate 12 contribute to setting the predetermined load required to change the plate 12 into an unlocked state.

Various embodiments of the locking mechanism 38 are discussed in connection with FIGS. 2–5 below. Of course, the embodiments discussed below are illustrative and are not to be considered limiting of the scope of this invention.

Figure 2A:
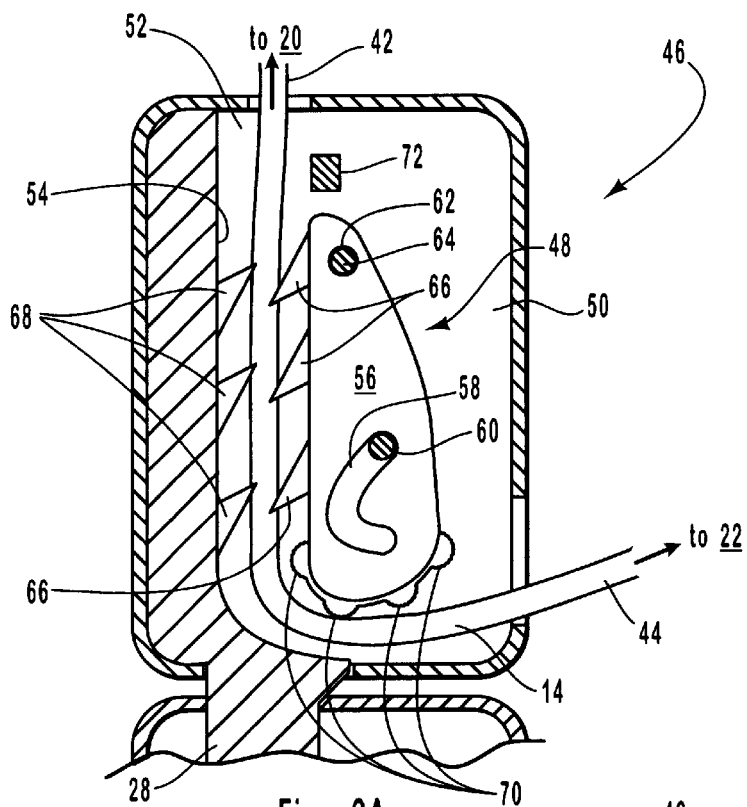
FIG. 2a is a cross-sectional view of a first embodiment of the breakaway latch plate in a locked state.
Figure 2B:
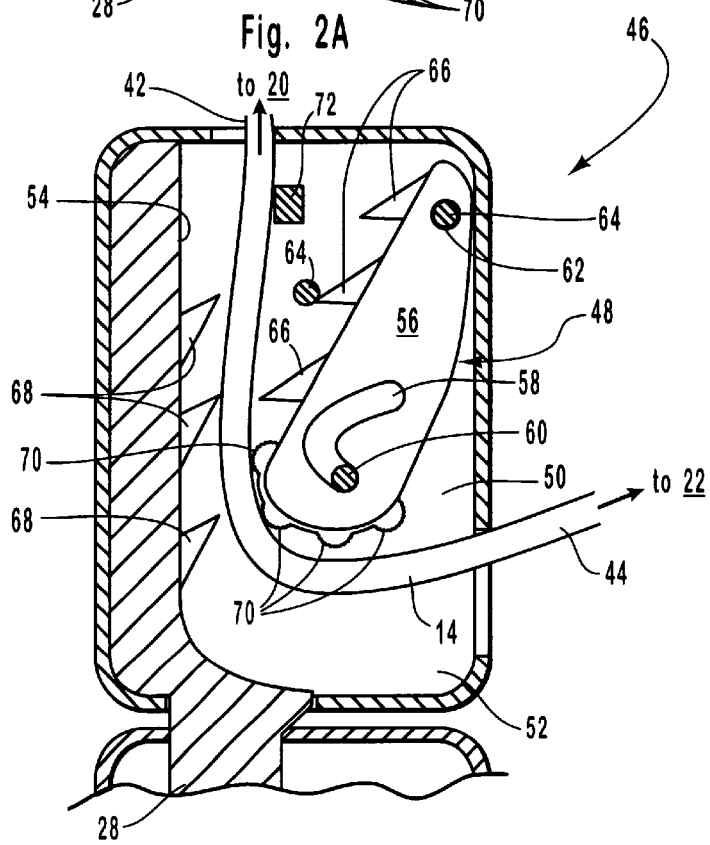
FIG. 2b is a cross-sectional view of the first embodiment of the breakaway latch plate in an unlocked state.

FIG. 2a is a cross-sectional view of a first embodiment of the breakaway latch plate 46 in a locked state, while FIG. 2b illustrates the breakaway latch plate 46 in an unlocked state. A locking mechanism 48 is coupled to a latch plate body 50, and the seat belt webbing 14 passes through an orifice 52, which is defined by an interior surface 54 of the latch plate body 50. As before, the locking mechanism 48, in a locked state, prevents movement of the seat belt webbing 14 relative to the latch plate body 50 and, in an unlocked state, permits such movement.

In one embodiment, the locking mechanism 48 includes a cam 56. As illustrated, the cam 56 is asymmetrically shaped. However, it should be noted that the cam 56 may be embodied in various symmetrical shapes, such as a circle.

The cam 56 may include a guide track 58, which is shaped to receive a guide pin 60. The guide pin 60 is attached to the latch plate body 50 and may be disposed within the guide track 58. As illustrated, the guide track 58 follows a non-linear course, although a guide track 58 with a linear course also comes within the scope of this invention. However, in other embodiments, the guide track 58 may be circular and sized to receive the guide pin 60, allowing for rotation of the cam 56 about the guide pin 60 but not movement of the guide pin 60 within the guide track 58.

The cam 56 may also include a pin opening 62, which is shaped to receive a breakaway pin 64. The breakaway pin 64 is attached to the latch plate body 50 and may be disposed within the pin opening 62. The breakaway pin 64 is configured to break upon the application of at least a particular amount of force to the pin 64, which corresponds to the predetermined load required to change the latch plate 50 into an unlocked state.

In addition, a movable gripping mechanism 66 may be disposed on the cam 56. In the locked state, the movable gripping mechanism 66 contacts and grips the seat belt webbing 14 to prevent the seat belt webbing 14 from moving with respect to the latch plate body 50. The movable gripping mechanism 66 may be embodied as teeth or another uneven surface that grips the seat belt webbing 14 and maintains the webbing 14 in a fixed position relative to the latch plate body 50 when the locking mechanism 48 is in a locked state.

The locking mechanism 48 may further include a fixed gripping mechanism 68 attached to the latch plate body 50 that contacts and grips the seat belt webbing 14 when the locking mechanism 48 is in a locked state. As with the movable locking mechanism 66, the fixed locking mechanism 68 may be embodied as teeth or another uneven surface for gripping the seat belt webbing 14. The fixed locking mechanism 68 aids the movable locking mechanism 66 in maintaining the seat belt webbing 14 in a fixed position relative to the latch plate body 50 when the locking mechanism 48 is in a locked state.

When a load is applied to the seat belt webbing 14, force is applied to the gripping mechanism 66, which is gripping the seat belt webbing 14, and the cam 56. That force is thus applied to the breakaway pin 64.

As illustrated in FIG. 2b, when a predetermined load is applied to the seat belt webbing 14, the breakaway pin 64 breaks enabling the cam 56 to rotate about the guide pin 60 and separate the movable gripping mechanism 66 from the seat belt webbing 14. The force of the seat belt webbing 14, under the influence of the predetermined load, will push the movable locking mechanism 66 away from the seat belt webbing 14. As such, the seat belt webbing 14 may move through the orifice 52, unimpeded by the movable gripping mechanism 66.

Referring to both FIGS. 2a and 2b, in one embodiment, the movable gripping mechanism 66 comprises teeth inclined to limit movement of the seat belt webbing 14 through the orifice 52 toward the torso retractor 20, and the fixed gripping mechanism 68 comprises teeth inclined to limit movement of the seat belt webbing 14 through the orifice 52 toward the lap retractor 22, as illustrated in FIG. 2a–b. As a consequence, in such an embodiment, only the application of the predetermined load to the torso portion 42 of the seat belt webbing 14 will displace the cam 56 and permit movement of the seat belt webbing 14 relative to the latch plate body 50.

Of course, the teeth of the movable gripping mechanisms 66 could be inclined to limit movement of the seat belt webbing 14 toward the lap retractor 22, and the teeth of the fixed gripping mechanism 68 could be inclined to limit movement of the seat belt webbing 14 toward the torso retractor 20 so that only application of the predetermined load to the lap portion 44 of the seat belt webbing 14 would displace the cam 56. Also, it should be noted that uninclined teeth (teeth which are generally perpendicular to the seat belt webbing) also come within the scope of this invention.

Referring still to FIGS. 2a and 2b, in one embodiment, frictional undulations 70 may be disposed on the cam 56. The frictional undulations 70 contact the seat belt webbing 14 when the locking mechanism 48 is in an unlocked state. The undulations 70 may be embodied as illustrated in FIGS. 2a and 2b or may include another uneven surface that serves to moderate the speed with which the seat belt webbing 14 moves through the orifice 52 in the unlocked state.

In addition, the locking mechanism 48 may include a web guide 72. The web guide 72 prevents the seat belt webbing 14 from contacting the movable gripping mechanism 66 when the locking mechanism is in an unlocked state. Without the web guide 70 the seat belt webbing 14 could contact the movable gripping mechanism 66, undesirably limiting movement of the webbing 14.

In an alternative embodiment, the guide pin 60 may also be frangible. In such an embodiment, when the predetermined load is applied to the seat belt webbing 14, both the guide pin 60 and the breakaway pin 64 may break, enabling the movable gripping mechanism 66 to move away from the seat belt webbing 14.

Figure 3A:
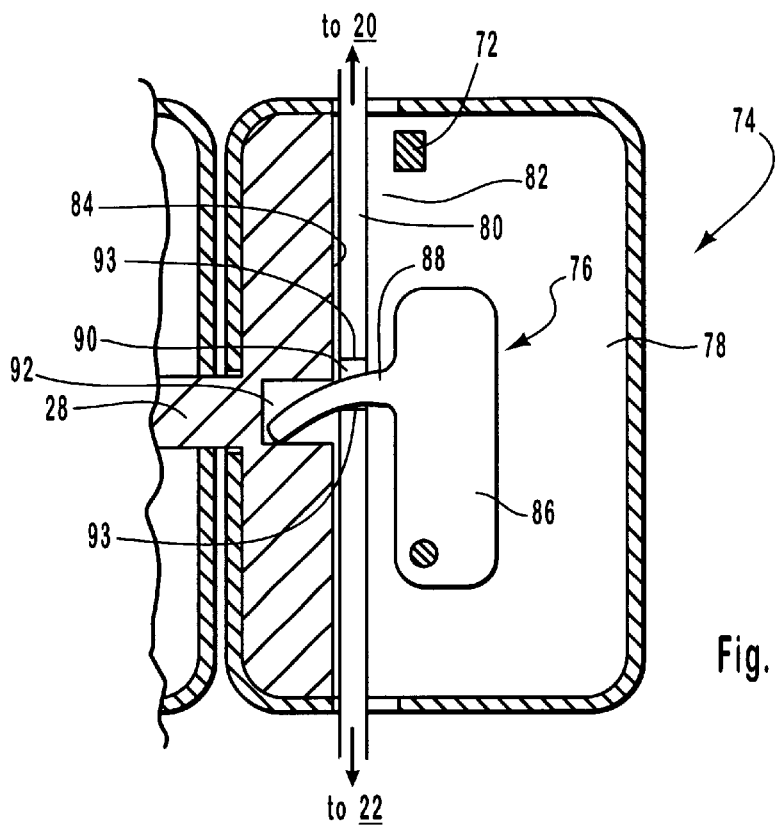
FIG. 3a is a cross-sectional view of a second embodiment of the breakaway latch plate in a locked state.
Figure 3B:
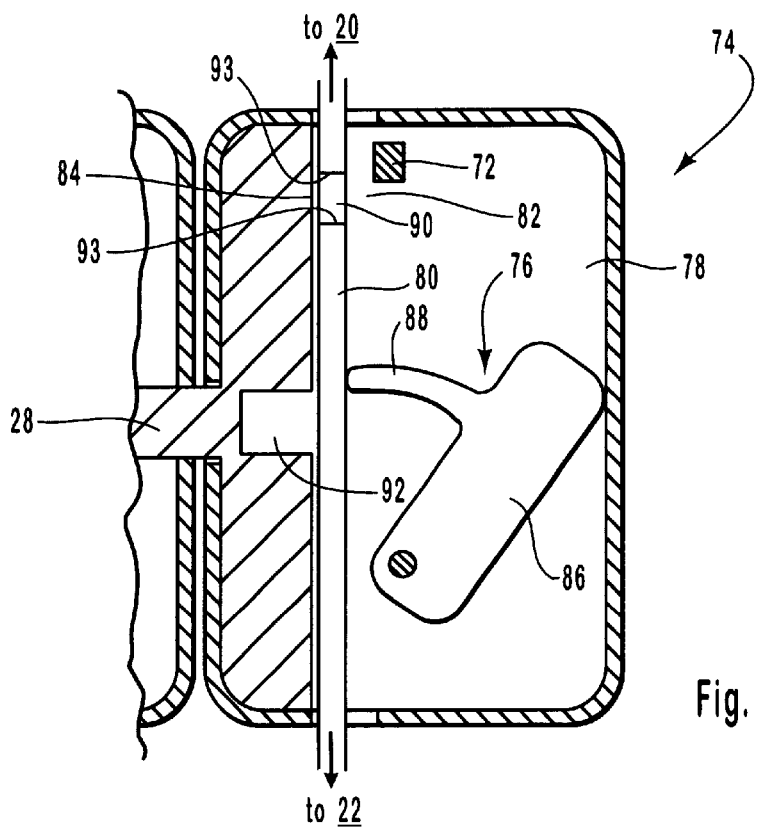
FIG. 3b is a cross-sectional view of the second embodiment of the breakaway latch plate in an unlocked state.

FIG. 3a is a cross-sectional view of a second embodiment of the breakaway latch plate 74 in a locked state, while FIG. 3b illustrates the breakaway latch plate 74 in an unlocked state. A locking mechanism 76 is coupled to the latch plate body 78, and seat belt webbing 80 (inflatable or conventional seat belt webbing) passes through an orifice 82, which is defined by an interior surface 84 of the latch plate body 78. As before, a locking mechanism 76 prevents movement of the seat belt webbing 80 relative to the latch plate body 78 in a locked state and in an unlocked state, permits such movement.

The locking mechanism 76 includes a hinged cam 86. The hinged cam 86 is rotatably connected to the latch plate body 78. A locking pin 88, which is deformable upon the application of at least a particular force, is disposed on the hinged cam 86. The particular force required to deform the locking pin 88 corresponds to the predetermined load required to change the latch plate 74 into an unlocked state.

An aperture 90 is disposed within the seat belt webbing 80. The aperture 90 may be sized to receive the locking pin 88. Of course, the aperture 90 may be configured in various shapes, such as rectangular, square, or round.

A retention notch 92 is defined by the interior surface 84, which also defines the orifice 82. The retention notch 92 is shaped to receive and retain the locking pin 88 when the locking mechanism 76 is in a locked state, as shown in FIG. 3a. The retention notch 92 may be configured in various ways, such as a recess defined by the surface 84. Alternatively, the retention notch 92 may be formed by one or more surrounding protrusions defined by the surface 84.

In the locked state, the locking pin 88 is disposed through the aperture 90 and retained within the retention notch 92, as illustrated in FIG. 3a. In the locked state, the locking mechanism 76 prevents movement of the seat belt webbing 80 relative to the latch plate body 78.

When a load is applied to the seat belt webbing 80, the seat belt webbing 80 at the edges 93 of the aperture 90 exerts force on the locking pin 88. As illustrated in FIG. 3b, when at least a predetermined load is applied to the seat belt webbing 80, the force applied to the locking pin 88 deforms a locking pin 88 and displaces the pin 88 from within the aperture 90 and the retention notch 92, as the hinged cam 86 rotates away from the seat belt webbing 80. In this unlocked state, the seat belt webbing 80 may move with respect to the latch plate body 78.

Figure 4A:
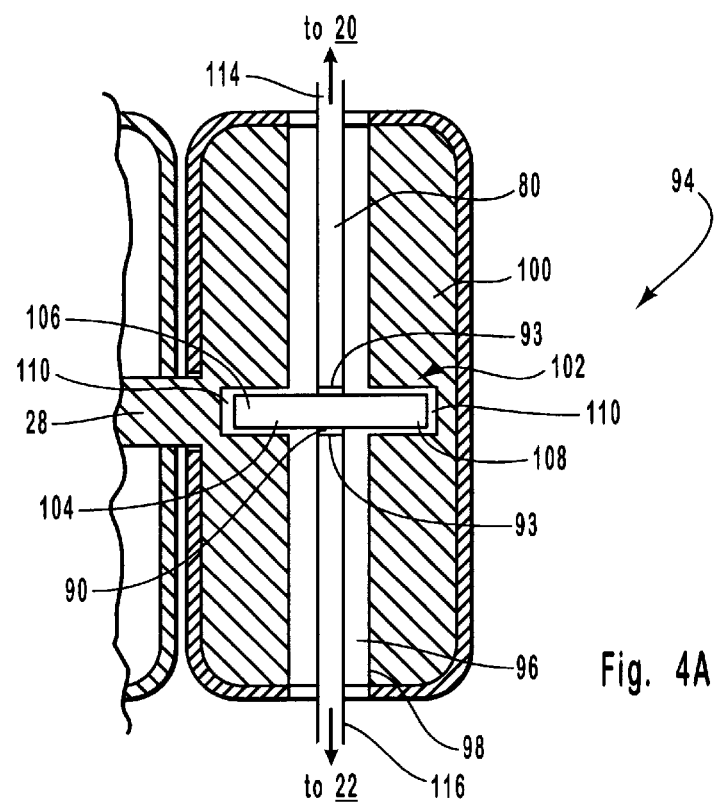
FIG. 4a is a cross-sectional view of a third embodiment of the breakaway latch plate in a locked state.
Figure 4B:
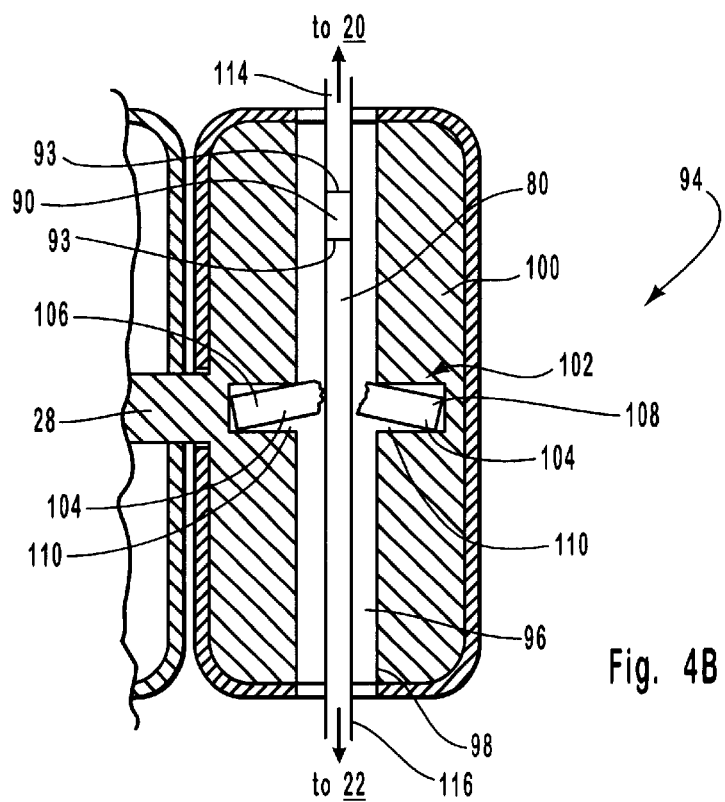
FIG. 4b is a cross-sectional view of the third embodiment of the breakaway latch plate in an unlocked state.

FIG. 4a is a cross-sectional view of a third embodiment of the breakaway latch plate 94 in a locked state, while FIG. 4b illustrates the breakaway latch plate 94 in an unlocked state. As before, the seat belt webbing 80 passes through an orifice 96, which is defined by an interior surface 98 of a latch plate body 100. Again, an aperture 90, which may be configured in various shapes, is disposed within the seat belt webbing 80.

A locking mechanism 102 retains the seat belt webbing 80 in a fixed position relative to the latch plate body 100 when in a locked state. In this embodiment, the locking mechanism 102 comprises a locking pin 104. The locking pin 104 is frangible and breaks upon the application of at least a predetermined force. The predetermined force required to break the locking pin 104 corresponds to the predetermined load required to change the latch plate 94 into an unlocked state.

The locking pin 104 includes a first and a second end 106, 108. The locking pin 104 may be configured in a variety of different shapes and sizes according to, for example, the desired force at which a manufacturer desires the locking pin 104 to break.

The interior surface 98, which defines the orifice 96, further defines at least one retention notch 110 within the orifice 96. The retention notch or notches 110 are shaped and positioned to retain the first and second ends 106, 108 of the locking pin 104 when the locking mechanism 102 is in a locked state, as illustrated in FIG. 4a.

The retention notch or notches 110 may be configured in a number of different ways within the scope of this invention. For instance, a single retention notch 110 may be disposed around the interior surface 98, or at least a portion of the interior surface 98, of the orifice 96 for receiving both the first and second ends 106, 108 of the locking pin 104. Alternatively, for example, two or more discrete retention notches 110 may be disposed on opposing sides of the orifice 96. Again, the retention notch 110 may be defined by a recess in the orifice 96 (as illustrated in FIG. 4a) or by protrusions disposed on the orifice 96.

In the locked state, the locking pin 104 is disposed through the aperture 90 of the seat belt webbing 80 and the first and second ends 106, 108 of the locking pin 104 are retained within the retention notch or notches 110, as illustrated in FIG. 4a. When at least a predetermined load is applied to the seat belt webbing 80, the pressure applied by seat belt webbing 80 at the edges 93 of the aperture 90 to the locking pin 104 breaks the locking pin 104, as shown in FIG. 4b. Consequently, in the unlocked state, the seat belt webbing 80 may move relative to the latch plate body 100 and tension from the torso portion 114 of the seat belt webbing 80 (the portion of the seat belt webbing above the latch plate) may be transferred to the lap portion 116 of the seat belt webbing 80 (the portion of the seat belt webbing below the latch plate) or vice versa.

In an alternative embodiment, either one or both of the first and second ends 106, 108 of the locking pin 104 are attached to the surface 98 defining the orifice 96. Also, either the first or second ends 106, 108 of the locking pin 104 may be disposed within a retention notch 110, while the other end 106, 108 is attached to the surface 98 defining the orifice 96.

Figure 5A:
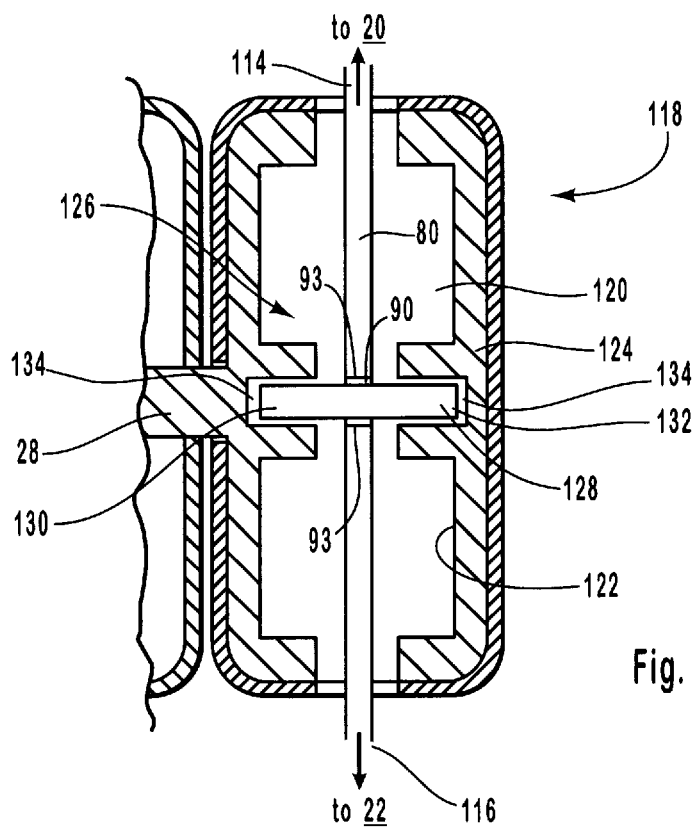
FIG. 5a is a cross-sectional view of a fourth embodiment of the breakaway latch plate in a locked state.
Figure 5B:
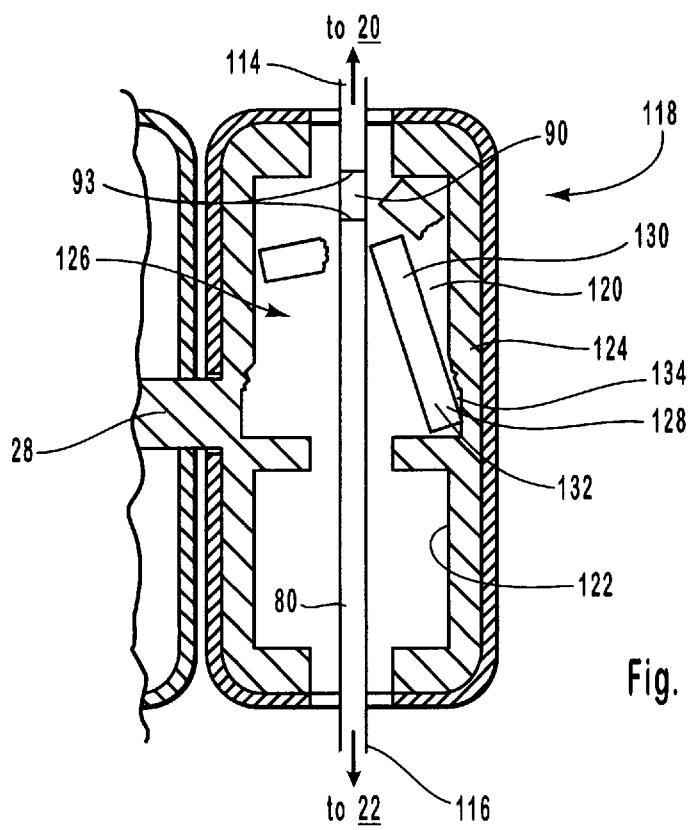
FIG. 5b is a cross-sectional view of the fourth embodiment of the breakaway latch plate in an unlocked state.

FIG. 5a is a cross-sectional view of a fourth embodiment of the breakaway latch plate 118 in a locked state, while FIG. 5b illustrates the breakaway latch plate 118 in an unlocked state. As before, the seat belt webbing 80 passes through an orifice 120, which is defined by an interior surface 122 of the latch plate body 124. Again, an aperture 90, which may be configured in various shapes, is disposed within the seat belt webbing 80.

Once again, a locking mechanism 126 retains the seat belt webbing 80 in a fixed position relative to the latch plate body 124 when in a locked state. In this embodiment, the locking mechanism 126 comprises a locking pin 128. The locking pin 128 includes a first and a second ends 130, 132 and maybe configured in various shapes and sizes, as stated above. In this embodiment, however, the locking pin 128 is not designed to break.

The interior surface 122, which defines the orifice 120, further defines at least one frangible retention notch 134 within the orifice 120. The frangible retention notch or notches 134 may be similar in shape and position to the retention notch or notches 110 disclosed in connection with the FIGS. 4a–b. The frangible notch or notches 134 are likewise configured to receive and retain the first and second ends 130, 132 of the locking pin 128. However, the frangible retention notch 134 is configured to break upon the application of the least a predetermined force. The predetermined force required to break the frangible retention notch 134 corresponds to the predetermined load required to change the latch plate 118 into an unlocked state.

Thus, in the locked state, the locking pin 128 is disposed through the aperture 90 and the first and the second ends 130, 132 of the locking pin 128 are retained within the frangible retention notch or notches 134, as illustrated in FIG. 5a. When a load is applied to the seat belt webbing 80, the seat belt webbing 80, at the edges 93 of the aperture 90, applies force to the locking pin 128, which, in turn, exerts force on the frangible notch or notches 134. When at least the predetermined load is applied to the seat belt webbing 80, the frangible notch 134 breaks to permit movement of the seat belt webbing 80 relative to the latch plate body 124, as illustrated in FIG. 5b.

In view of the foregoing, the breakaway latch plate 12, 46, 74, 94, 118 offers advantages not present in conventional latch plates. The breakaway latch plate 12, 46, 74, 94, 118 retains a fixed position relative to the seat belt webbing 14, 80 during normal usage. Thus, the latch plate 12, 46, 74, 94, 118 may be conveniently accessed and used by an occupant. However, in accident conditions, the latch plate 12, 46, 74, 94, 118 is movable with respect to the seat belt webbing 14, 80, permitting tension from the torso portion 42, 114 of the seat belt webbing 14, 80 to be transferred to the lap portion 44, 116 of the seat belt webbing 14, 80 and vice versa.

In view of the foregoing, present invention may be embodied in other specific forms without departing from its scope or essential characteristics. The described embodiments are to be considered in all respects only illustrative, not restrictive. The scope of the invention is, therefore, indicated by the appended claims rather than by the foregoing description. All changes that come within the meaning and range of equivalency of the claims are to be embraced within their scope.

What is claimed is:

1. A latch plate for use with seat belt webbing, comprising:

a latch plate body having an interior surface defining an orifice through which seat belt webbing passes;

a buckle for interfacing with the latch plate body; and a locking mechanism coupled to the latch plate body, the locking mechanism having a locked and an unlocked state, wherein in the locked state, the locking mechanism prevents movement of the seat belt webbing relative to the latch plate body and in the unlocked state, the locking mechanism permits movement of the seat belt webbing relative to the latch plate body, and wherein, when the latch plate body is secured to the buckle, the locking mechanism changes from the locked state to the unlocked state in response to at least a predetermined load being applied to the seat belt webbing.

2. The seat belt system as defined in claim 1, wherein the locking mechanism comprises:

a cam having a guide track, a pin opening, and a movable gripping mechanism, wherein the movable gripping mechanism contacts and grips the seat belt webbing when the locking mechanism is in a locked state;

a guide pin attached to the latch plate body and disposed within the guide track;

a breakaway pin attached to the latch plate body and disposed within the pin opening, wherein the breakaway pin breaks upon the application of at least the predetermined load to the seat belt webbing to enable the cam to rotate about the guide pin and separate the gripping mechanism from the seat belt webbing; and a fixed gripping mechanism for contacting and gripping the seat belt webbing when the locking mechanism is in the locked state.

3. The seat belt system as defined in claim 2, wherein the movable gripping mechanism comprises teeth inclined to limit movement of the seat belt webbing through the orifice toward the torso retractor and the fixed gripping mechanism comprises teeth inclined to limit movement of the seat belt webbing through the orifice toward the lap retractor.

4. The seat belt system as defined in claim 1, further comprising an aperture disposed within the seat belt webbing, and wherein the locking mechanism comprises a locking pin disposed within the aperture when the locking mechanism is in the locked state.

5. The seat belt system as defined in claim 4, wherein the interior surface defines a retention notch within the orifice, and wherein the locking mechanism further comprises a hinged cam rotatably connected to the latch plate body, wherein the locking pin is deformable and is attached to the hinged cam, and wherein, in the locked state, the locking pin is disposed within the aperture and retained within the retention notch, and wherein when at least the predetermined load is applied to the seat belt webbing the locking pin deforms and is displaced from within the aperture and retention notch as the hinged cam rotates away from the seat belt webbing.

6. The seat belt system as defined in claim 4, wherein the locking pin is frangible and comprises a first and a second end, and wherein the interior surface defines at least one retention notch within the orifice for receiving the first and second ends of the locking pin, and wherein when the locking mechanism is in a locked state, the locking pin is disposed through the aperture and the first and the second ends of the locking pin are retained within the at least one retention notch, and wherein when at least the predetermined load is applied to the seat belt webbing the locking pin breaks to permit movement of the seat belt webbing relative to the latch plate body.

7. The seat belt system as defined in claim 4, wherein the locking pin comprises a first and a second end, and wherein the interior surface defines at least one frangible retention notch within the orifice for receiving the first and second ends of the locking pin, and wherein when the locking mechanism is in a locked state, the locking pin is disposed through the aperture and the first and the second ends of the locking pin are retained within the at least one retention notch, and wherein when at least the predetermined load is applied to the seat belt webbing the at least one frangible notch breaks to permit movement of the seat belt webbing relative to the latch plate body.

8. A seat belt apparatus, comprising:

seat belt webbing;

a latch plate body having an interior surface defining an orifice through which the seat belt webbing passes;

a buckle for interfacing with the latch plate body; and a locking mechanism coupled to the latch plate body, the locking mechanism having a locked and an unlocked state, wherein in the locked state, the locking mechanism prevents movement of the seat belt webbing relative to the latch plate body and in the unlocked state, the locking mechanism permits movement of the seat belt webbing relative to the latch plate body, and wherein, when the latch plate body is secured to the buckle, the locking mechanism changes from the locked state to the unlocked state in response to at least a predetermined load being applied to the seat belt webbing.

9. The seat belt apparatus as defined in claim 8, wherein the locking mechanism comprises:

a cam having a guide track, a pin opening, and a movable gripping mechanism, wherein the movable gripping mechanism contacts and grips the seat belt webbing when the locking mechanism is in a locked state;

a guide pin attached to the latch plate body and disposed within the guide track; and a breakaway pin attached to the latch plate body and disposed within the pin opening, wherein the breakaway pin breaks upon the application of at least the predetermined load to the seat belt webbing to enable the cam to rotate about the guide pin and separate the gripping mechanism from the seat belt webbing.

10. The seat belt apparatus as defined in claim 9, further comprising frictional undulations disposed on the cam, wherein the frictional undulations contact the seat belt webbing when the locking mechanism is in an unlocked state.

11. The seat belt apparatus as defined in claim 9, wherein the locking mechanism further comprises a fixed gripping mechanism for contacting and gripping the seat belt webbing when the locking mechanism is in a locked state.

12. The seat belt apparatus as defined in claim 8, further comprising an aperture disposed within the seat belt webbing, and wherein the locking mechanism comprises a locking pin disposed within the aperture when the locking mechanism is in the locked state.

13. The seat belt apparatus as defined in claim 12, wherein the interior surface defines a retention notch within the orifice, and wherein the locking mechanism further comprises a hinged cam rotatably connected to the latch plate body, wherein the locking pin is deformable and is attached to the hinged cam, and wherein, in the locked state, the locking pin is disposed within the aperture and retained within the retention notch, and wherein when at least the predetermined load is applied to the seat belt webbing the locking pin deforms and is displaced from within the aperture and retention notch as the hinged cam rotates away from the seat belt webbing.

14. The seatbelt apparatus as defined in claim 12, wherein the locking pin is frangible and comprises a first and a second end, and wherein the interior surface defines at least one retention notch within the orifice for receiving the first and second ends of the locking pin, and wherein when the locking mechanism is in a locked state, the locking pin is disposed through the aperture and the first and the second ends are retained within the at least one retention notch, and wherein when at least the predetermined load is applied to the seat belt webbing the locking pin breaks to permit movement of the seat belt webbing relative to the latch plate body.

15. The seatbelt apparatus as defined in claim 12, wherein the locking pin comprises a first and a second end, and wherein the interior surface defines at least one frangible retention notch within the orifice for receiving the first and second ends of the locking pin, and wherein when the locking mechanism is in a locked state, the locking pin is disposed through the aperture and the first and the second ends are retained within the at least one retention notch, and wherein when at least the predetermined load is applied to the seat belt webbing the at least one frangible notch breaks to permit movement of the seat belt webbing relative to the latch plate body.

16. A seat belt system comprising:
    seat belt webbing having a first and a second end;
    a torso retractor coupled to the first end of the seat belt webbing;
    a lap retractor coupled to the second end of the seat belt webbing;
    a latch plate body having an interior surface defining an orifice through which the seat belt webbing passes;
    a buckle for interfacing with the latch plate body; and
    a locking mechanism coupled to the latch plate body, the locking mechanism having a locked and an unlocked state, wherein in the locked state, the locking mechanism prevents movement of the seat belt webbing relative to the latch plate body and in the unlocked state, the locking mechanism permits movement of the seat belt webbing relative to the latch plate body, and wherein, when the latch plate body is secured to the buckle, the locking mechanism changes from the locked state to the unlocked state in response to at least a predetermined load being applied to the seat belt webbing.

17. The latch plate as defined in claim 16, wherein the locking mechanism comprises:
    a cam having a guide track, a pin opening, and a movable gripping mechanism, wherein the movable gripping mechanism contacts and grips the seat belt webbing when the locking mechanism is in a locked state;
    a guide pin attached to the latch plate body and disposed within the guide track; and
    a breakaway pin attached to the latch plate body and disposed within the pin opening, wherein the breakaway pin breaks upon the application of at least the predetermined load to the seat belt webbing to enable the cam to rotate about the guide pin and separate the gripping mechanism from the seat belt webbing.

18. The latch plate as defined in claim 17, further comprising a fixed gripping mechanism attached to the latch plate body that contacts and grips the seat belt webbing when the locking mechanism is in a locked state.

19. The latch plate as defined in claim 16, further comprising an aperture disposed within the seat belt webbing, and wherein the locking mechanism comprises a locking pin disposed within the aperture when the locking mechanism is in the locked state.

20. The latch plate as defined in claim 19, wherein the interior surface defines a retention notch within the orifice, and wherein the locking mechanism further comprises a hinged cam rotatably connected to the latch plate body, wherein the locking pin is deformable and is attached to the hinged cam, and wherein, in the locked state, the locking pin is disposed within the aperture and retained within the retention notch, and wherein when at least the predetermined load is applied to the seat belt webbing the locking pin deforms and is displaced from within the aperture and retention notch as the hinged cam rotates away from the seat belt webbing.

21. The latch plate as defined in claim 19, wherein the locking pin is frangible and comprises a first and a second end, and wherein the interior surface defines at least one retention notch within the orifice for receiving the first and second ends of the locking pin, and wherein when the locking mechanism is in a locked state, the locking pin is disposed through the aperture and the first and the second ends are retained within the at least one retention notch, and wherein when at least the predetermined load is applied to the seat belt webbing the locking pin breaks to permit movement of the seat belt webbing relative to the latch plate body.

22. The latch plate as defined in claim 19, wherein the locking pin comprises a first and a second end, and wherein the interior surface defines at least one frangible retention notch within the orifice for receiving the first and second ends of the locking pin, and wherein when the locking mechanism is in a locked state, the locking pin is disposed through the aperture and the first and the second ends are retained within the at least one retention notch, and wherein when at least the predetermined load is applied to the seat belt webbing the at least one frangible notch breaks to permit movement of the seat belt webbing relative to the latch plate body.

23. The latch plate as defined in claim 16, wherein the seat belt webbing comprises inflatable seat belt webbing.

* * * * *